(12) United States Patent
Huang et al.

(10) Patent No.: US 12,032,512 B2
(45) Date of Patent: Jul. 9, 2024

(54) PROCESSOR CHIP, DONGLE DEVICE, AND OPERATION METHOD

(71) Applicant: Realtek Semiconductor Corporation, Hsinchu (TW)

(72) Inventors: Zhen-Ting Huang, Hsinchu (TW); Er-Zih Wong, Hsinchu (TW); Shih-Chiang Chu, Hsinchu (TW); Chun-Hao Lin, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 1 day.

(21) Appl. No.: 17/655,365

(22) Filed: Mar. 17, 2022

(65) Prior Publication Data
US 2022/0405233 A1 Dec. 22, 2022

(30) Foreign Application Priority Data
Jun. 17, 2021 (TW) .................................. 110122239

(51) Int. Cl.
*G06F 15/78* (2006.01)
*G06F 9/4401* (2018.01)
*G06F 13/10* (2006.01)

(52) U.S. Cl.
CPC ........ *G06F 15/7892* (2013.01); *G06F 9/4411* (2013.01); *G06F 13/10* (2013.01); *G06F 15/7875* (2013.01)

(58) Field of Classification Search
CPC .... G06F 15/7892; G06F 9/4411; G06F 13/10; G06F 15/7875
See application file for complete search history.

(56) References Cited

U.S. PATENT DOCUMENTS

| | | | |
|---|---|---|---|
| 6,253,334 B1* | 6/2001 | Amdahl | G06F 1/206 |
| | | | 709/239 |
| 8,886,839 B1* | 11/2014 | Loc | H04L 45/02 |
| | | | 709/224 |

(Continued)

OTHER PUBLICATIONS

Bruce Balden et al., "Universal Serial Bus Communications Class Subclass Specifications for Network Control Model Devices," sponsored by USB Implementers Forum, Inc., Revision 1.0 (Errata 1), Nov. 24, 2010, Chapter 4-5, p. 24-28. It also can be retrieved from https://www.usb.org/document-library/network-control-model-devices-specification-v10-and-errata-and-adopters-agreement.

(Continued)

*Primary Examiner* — Zahid Choudhury
(74) *Attorney, Agent, or Firm* — CKC & Partners Co., LLC (57) ABSTRACT

A processor chip includes a logic circuit. The logic circuit is configured to be coupled to an electronic device. A configuration of the logic circuit corresponds to a plurality of candidate configurations. The configuration of the logic circuit is switched among the candidate configurations, and the electronic device associates with the processor chip to implement a function corresponding to the configuration of the logic circuit. When the configuration of the logic circuit is a first configuration and the electronic device executes a first driver program, the function is a first network-connection function. When the configuration of the logic circuit is a second configuration and the electronic device executes a second driver program, the function is a second network-connection function different from the first network-connection function.

20 Claims, 8 Drawing Sheets

(56) References Cited

U.S. PATENT DOCUMENTS

| | | | | |
|---|---|---|---|---|
| 2008/0069079 A1* | 3/2008 | Jacobs | ................ | H04W 72/542 |
| | | | | 370/348 |
| 2008/0144493 A1* | 6/2008 | Yeh | .................. | H04W 74/0816 |
| | | | | 370/230 |
| 2011/0270952 A1* | 11/2011 | Ray | ........................ | H04L 12/10 |
| | | | | 709/217 |
| 2015/0074258 A1* | 3/2015 | Ferreira | ............. | H04L 43/0876 |
| | | | | 709/224 |
| 2017/0249165 A1* | 8/2017 | Lu | ........................ | G06F 9/4411 |

OTHER PUBLICATIONS

Russ Winsper et al., "Universal Serial Bus Communications Class Subclass Specification for Ethernet Emulation Model Devices," sponsored by USB Implementers Forum, Inc., Revision 1.0, Feb. 2, 2005, Chapter 2-3, p. 12-14. It also can be retrieved from https://www.usb.org/document-library/cdc-subclass-specification-ethernet-emulation-model-devices-10.

\* cited by examiner

PROCESSOR CHIP, DONGLE DEVICE, AND OPERATION METHOD

RELATED APPLICATIONS

This application claims priority to Taiwan Application Ser. No. 110122239, filed Jun. 17, 2021, which is herein incorporated by reference.

BACKGROUND

Technical Field

The present disclosure relates to a processor chip, a dongle device, and an operation method. More particularly, the present disclosure relates to a processor chip, a dongle device, and an operation method whose configurations are switchable.

Description of Related Art

With developments of technology, various electronic devices have been developed and are applied in our daily life. In some applications, an external device can be inserted into the electronic device. For example, when a dongle device is inserted into an electronic device which fails to support a specific function, this electronic device can associate with the inserted dongle device to support this specific function.

SUMMARY

Some aspects of the present disclosure are to provide a processor chip. The processor chip includes a logic circuit. The logic circuit is configured to be coupled to an electronic device. A configuration of the logic circuit corresponds to a plurality of candidate configurations. The configuration of the logic circuit is switched among the candidate configurations, and the electronic device associates with the processor chip to implement a function corresponding to the configuration of the logic circuit. When the configuration of the logic circuit is a first configuration and the electronic device executes a first driver program, the function is a first network-connection function. When the configuration of the logic circuit is a second configuration and the electronic device executes a second driver program, the function is a second network-connection function different from the first network-connection function.

Some aspects of the present disclosure are to provide a dongle device. The dongle device includes a processor chip. The processor chip includes a logic circuit. The dongle device is configured to couple an electronic device. A configuration of the logic circuit corresponds to a plurality of candidate configurations. The configuration of the logic circuit is switched among the candidate configurations, and the electronic device associates with the processor chip to implement a function corresponding to the configuration of the logic circuit. When the configuration of the logic circuit is a first configuration and the electronic device executes a first driver program, the function is a first network-connection function. When the configuration of the logic circuit is a second configuration and the electronic device executes a second driver program, the function is a second network-connection function different from the first network-connection function.

Some aspects of the present disclosure are to provide an operation method of an electronic system. The electronic system includes a dongle device and an electronic device, the dongle device is configured to couple the electronic device, and the dongle device comprises a processor chip. The operation method includes following operations: switching a configuration of a logic circuit in the processor chip among a plurality of candidate configurations; and implementing, by the electronic device associating with the processor chip, a function corresponding to the configuration of the logic circuit. When the configuration of the logic circuit is a first configuration and the electronic device executes a first driver program, the function is a first network-connection function. When the configuration of the logic circuit is a second configuration and the electronic device executes a second driver program, the function is a second network-connection function different from the first network-connection function.

Based on the descriptions above, in the present disclosure, the configuration of the processor chip in the dongle device can be switched among the candidate configurations. Accordingly, the dongle device of the present disclosure is applicable to various electronic devices.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
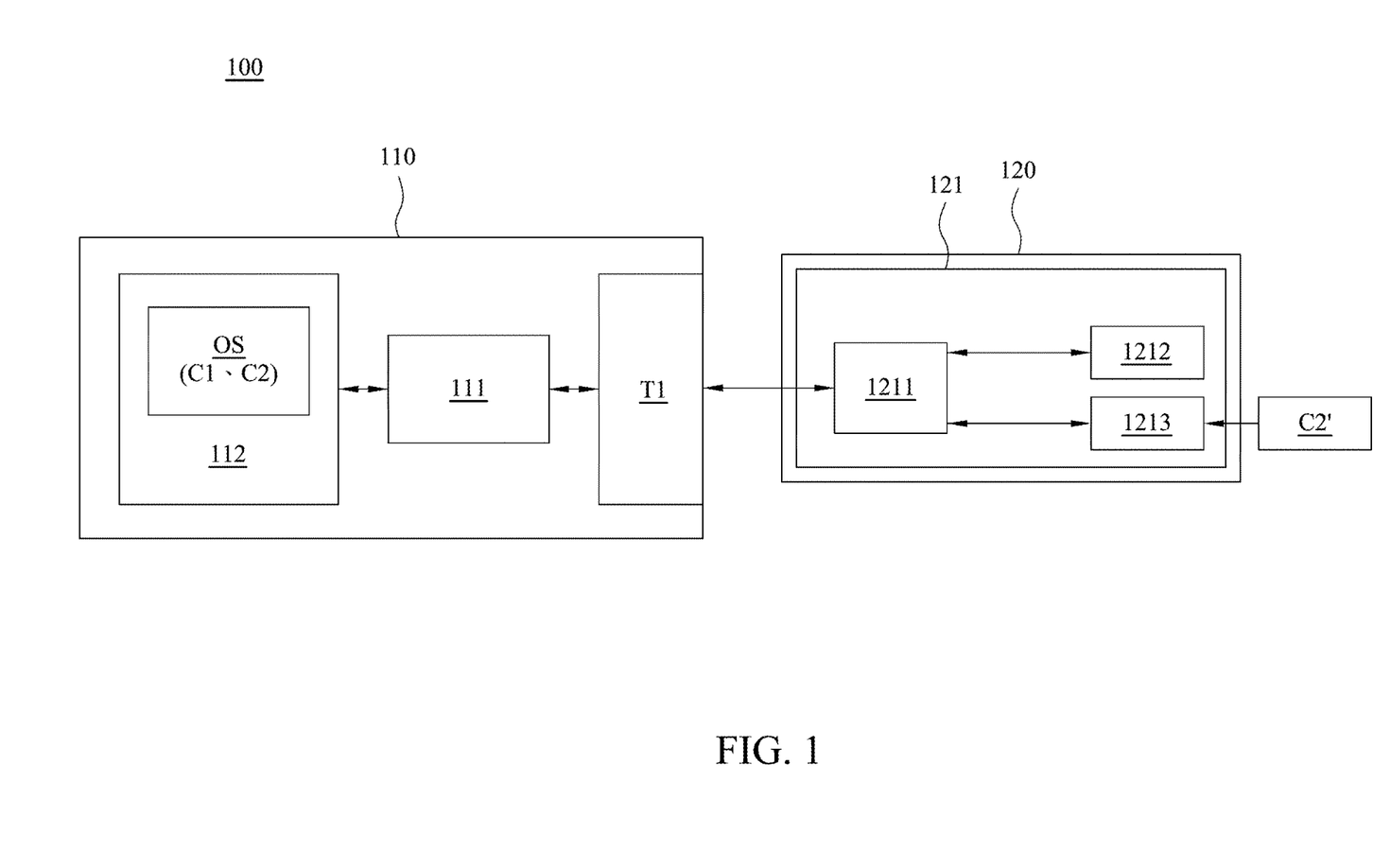
FIG. 1 is a schematic diagram illustrating an electronic system according to some embodiments of the present disclosure.

Reference is made to FIG. 1. FIG. 1 is a schematic diagram illustrating an electronic system 100 according to some embodiments of the present disclosure.

As illustrated in FIG. 1, the electronic system 100 includes an electronic device 110 and a dongle device 120. In some embodiments, the electronic device 110 can be a tablet, a laptop, a display device, or other electronic devices and the dongle device 120 can be a universal serial bus (USB) device, but the present disclosure is not limited thereto.

The electronic device 110 includes a processor circuit 111, a memory 112, and a connection port T1. The processor circuit 111 is coupled to the memory 112 and the connection port T1. The processor circuit 111 can be a central processor unit or other circuits/elements with data processing functions or signal processing functions. An operation system OS can be installed in the memory 112. The operation system OS is, for example, Windows, Linux, Android, and the present disclosure is not limited thereto. The processor circuit 111 can execute the operation system OS. The dongle device 120 can be inserted into the connection port T1. For example, the dongle device 120 can include a connection port (e.g., a male connector) corresponding to the connection port T1 (e.g., a female connector). The male connector of the dongle device 120 can be inserted into the connection port T1 of the electronic device 110 such that the dongle device 120 is coupled to the electronic device 110.

The dongle device 120 can further include a processor chip 121. The processor chip 121 includes a logic circuit 1211, a transmitter circuit 1212, and a receiver circuit 1213. The logic circuit 1211 is coupled to the transmitter circuit 1212 and the receiver circuit 1213. The logic circuit 1211 can include one or more transistors, one or more logic gates, and one or more control signals. Different configurations (i.e., different coupling relationships or different signal logic levels) of these transistors, these logic gates, and these control signals correspond to different configurations respectively. In other words, a configuration of the logic circuit 1211 can be switched by changing the coupling relationships of these transistors/these logic gates or changing the logic levels of the signals. The transmitter circuit 1212 can transmit data or signals to the outside of dongle device 120. The receiver circuit 1213 can receive data or signals from the outside of the dongle device 120.

Under a condition that the dongle device 120 is inserted into the connection port T1 (i.e., the logic circuit 1211 is coupled to the electronic device 110), when the electronic device 110 includes a driver program corresponding to the configuration of the logic circuit 1211, the electronic device 110 can execute the driver program to work with the processor chip 121 in the dongle device 120 to implement a corresponding function.

For example, under a condition that the electronic device 110 originally does not support a network-connection function but its operation system OS includes a built-in basic network-connection driver program C1, when the dongle device 120 is inserted into the connection port T1 of the electronic device 110 and the configuration of the logic circuit 1211 corresponds to a basic network-connection configuration, the electronic device 110 can execute the basic network-connection driver program C1 to work with the processor chip 121 in the dongle device 120 to implement a basic network-connection function.

The aforementioned basic network-connection driver program C1 can be a Network Control Mode (NCM) driver program or an Ethernet Network Control Mode (ECM) driver program. The NCM is that one transmitting unit includes a plurality of network packets, and the ECM is that one transmitting unit includes a single network packet. The aforementioned basic network-connection configuration can be a NCM configuration or an ECM configuration. In other words, when the dongle device 120 is inserted into the connection port T1 of the electronic device 110 and the configuration of the logic circuit 1211 corresponds to the NCM configuration (or the ECM configuration), the electronic device 110 can execute the NCM driver program (or the ECM driver program) to work with the processor chip 121 in the dongle device 120 to implement the basic network-connection function.

In practice applications, operation systems OS in different the electronic devices 110 may include different built-in basic network-connection driver programs C1. For example, the operation systems OS in some electronic device 110 include the built-in NCM driver programs, and the operation systems OS in some electronic device 110 include the built-in ECM driver programs. Accordingly, in some embodiments, the configuration of the logic circuit 1211 can be switched between the two basic network-connection configurations such that all of the aforementioned electronic devices 110 can implement the basic network-connection function through the dongle device 120. For example, the configuration of the logic circuit 1211 can be switched from the NCM configuration to the ECM configuration, or switched from the ECM configuration to the NCM configuration. Thus, the dongle device 120 can be applicable to the electronic devices 110 with different built-in basic network-connection driver programs C1.

Based on similar operation principles, under a condition that the electronic device 110 fails to support the network-connection function but its operation system OS includes a built-in vendor-defined driver program C2, when the dongle device 120 is inserted into the connection port T1 of the electronic device 110 and the configuration of the logic circuit 1211 is a vendor-defined configuration, the electronic device 110 can execute the vendor defined driver program C2 to work with the processor chip 121 in the dongle device 120 to implement an advanced network-connection function provided by the vendor defined driver program C2.

The aforementioned vendor defined driver program C2 can be provide by vendors. Different vendors can provide different vendor defined driver programs C2 corresponding to advanced network-connection functions with different performances. In some embodiments, the vendor defined driver program C2 can be updated to new versions by the vendors in a scheduled or unscheduled manner. In some embodiments, the vendor defined driver program C2 not only provides the advanced network-connection function, but also provides other functions. For example, the vendor defined driver program C2 can control a light emitting diode on the dongle device 120 to be lit up.

The aforementioned basic network-connection driver program C1 or the aforementioned vendor defined driver program C2 is mainly used to establish the communication between the electronic device 110 and the dongle device 120. For example, by utilizing the basic network-connection driver program C1 or the vendor defined driver program C2, the dongle device 120 can successfully receive the data packets from the electronic device 110 and then the dongle device 120 can transmit these data packets. Also, the dongle device 120 can successfully receive the data packets from the internet and then the dongle device 120 can transmit these data packets to the electronic device 110.

In general, compared to the basic network-connection function corresponding to the basic network-connection driver program C1, the performance of the advanced network-connection function corresponding to the vendor defined driver program C2 is usually better. For example, the packet collision rate of the basic network-connection function is relatively higher, and the packet collision rate of the advanced network-connection function is relatively lower. In other words, the packet collision rate of the basic network-connection function is higher than that of the advanced network-connection function.

In some related arts, the configuration of the logic circuit in the processor chip is fixed. In other words, the dongle device cannot associate with some electronic devices (e.g., the electronic devices without the driver program corresponding to the configuration of the logic circuit) to implement the corresponding functions. For example, when the configuration of the logic circuit is fixed to correspond to the vendor defined configuration and the electronic device is without the vendor defined driver program, the electronic device cannot execute any vendor defined driver program to work with the dongle device to implement the advanced network-connection function, and the fixed configuration of the logic circuit cannot be switched to a basic network-connection configuration to implement a basic network-connection function. In this case, a user can only sense that the dongle device is unable to provide the electronic device network-connection but the user cannot understand the reason.

Compared to the aforementioned related arts, in the present disclosure, the configuration of the logic circuit 1211 can be switched among the candidate configurations. When the configuration of the logic circuit 1211 is changed, the arrangements (i.e., the coupling relationships or the signal logic levels) of the transistors, the logic gates, and the control signals in the logic circuit 1211 are changed correspondingly. Accordingly, the dongle device 120 with switchable configuration can work with various electronic devices 110.

Figure 2:
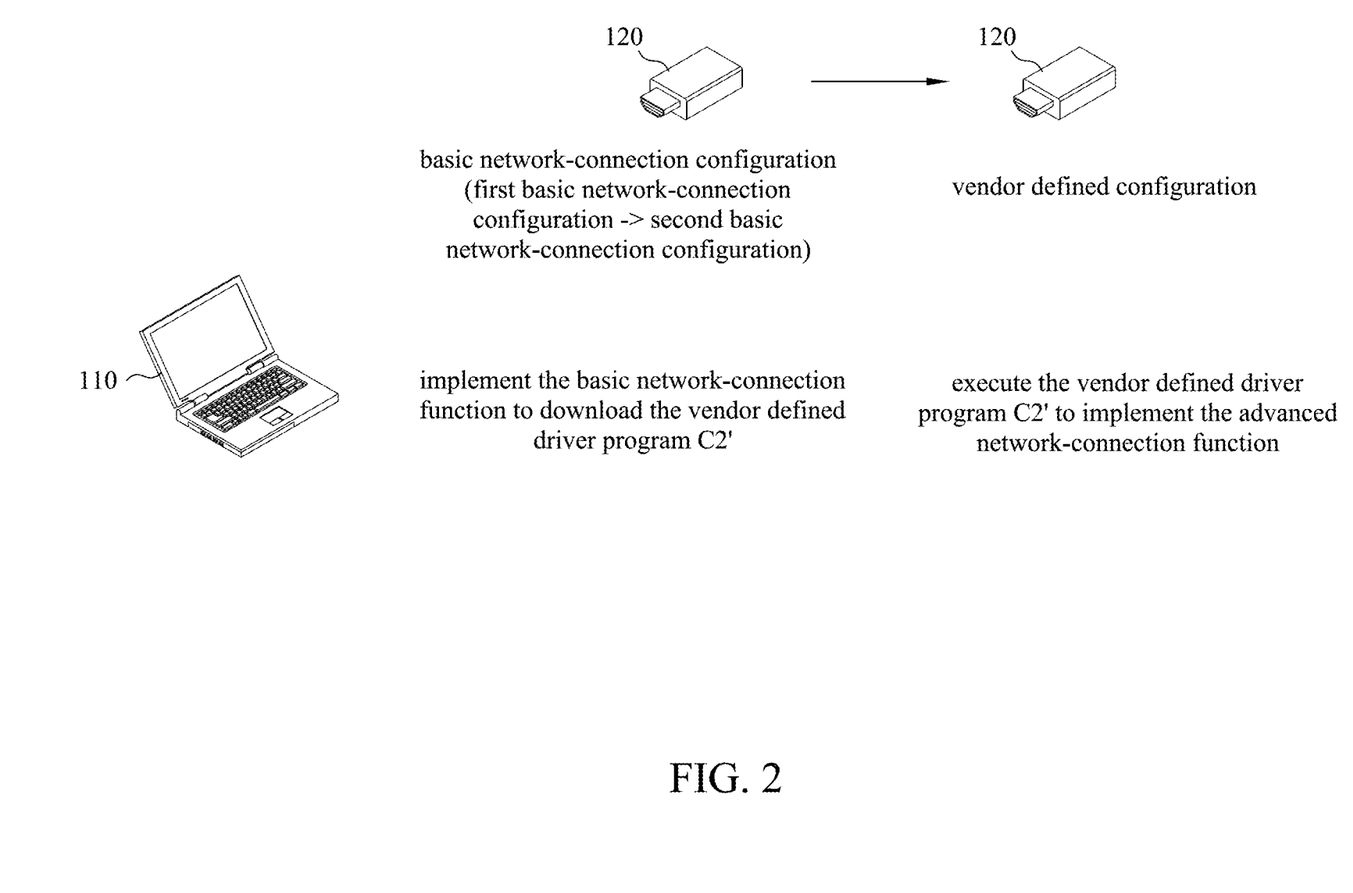
FIG. 2 is a schematic diagram illustrating operations of switching among configurations according to some embodiments of the present disclosure.

References are made to FIG. 1 and FIG. 2. FIG. 2 is a schematic diagram illustrating operations of switching among configurations according to some embodiments of the present disclosure. In some embodiments, the candidate configurations of the logic circuit 1211 include the basic network-connection configuration and the vendor defined configuration, but the present disclosure is not limited thereto.

As illustrated in FIG. 2, in some embodiments, when the configuration of the logic circuit 1211 is the basic network-connection configuration and the operation system OS in the electronic device 110 merely has the built-in basic network-connection driver program C1 but no vendor defined driver program C2, the processor chip 121 in the electronic device 110 can execute the basic network-connection driver program C1 to implement the basic network-connection function, in which a receiver circuit 1213 can automatically download a vendor defined driver program C2' from the internet. For example, in some embodiments, the vendor defined driver program C2' can be stored in a vendor's server in advance for the receiver circuit 1213 to download. As described above, the configuration of the logic circuit 1211 can be switched from the NCM configuration (e.g., the first basic network-connection configuration in FIG. 2) to the ECM configuration (e.g., the second basic network-connection configuration in FIG. 2), or switched from the ECM configuration (e.g., the first basic network-connection configuration in FIG. 2) to the NCM configuration (e.g., the second basic network-connection configuration in FIG. 2). Thus, the dongle device 120 can be applicable to various electronic devices 110 with different built-in basic network-connection driver programs C1.

Then, the configuration of the logic circuit 1211 can be switched to the vendor defined configuration. When the configuration of the logic circuit 1211 is switched to the vendor defined configuration, the electronic device 110 can execute the vendor defined driver program C2' download from the internet to work with the processor chip 121 in the dongle device 120 to implement the advanced network-connection function.

In some embodiments, most of electronic devices 110 (with the same or different operation systems OS) include one of the aforementioned basic network-connection driver programs C1, so these electronic devices 110 can associate with the processor chip 121 in the dongle device 120 to implement the basic network-connection function. Then, the electronic devices 110 can work with the dongle device 120 to download the vendor defined driver program C2' from the internet to implement the advanced network-connection function. As described above, in general, the performance of the advanced network-connection function is relatively better. Accordingly, not only the dongle device 120 is applicable to most of electronic devices 110 (with the same or different operation systems OS), but also the network-connection function of the electronic device 110 can be optimized (e.g., switched from the basic network-connection function to the advanced network-connection function).

Figure 3A:
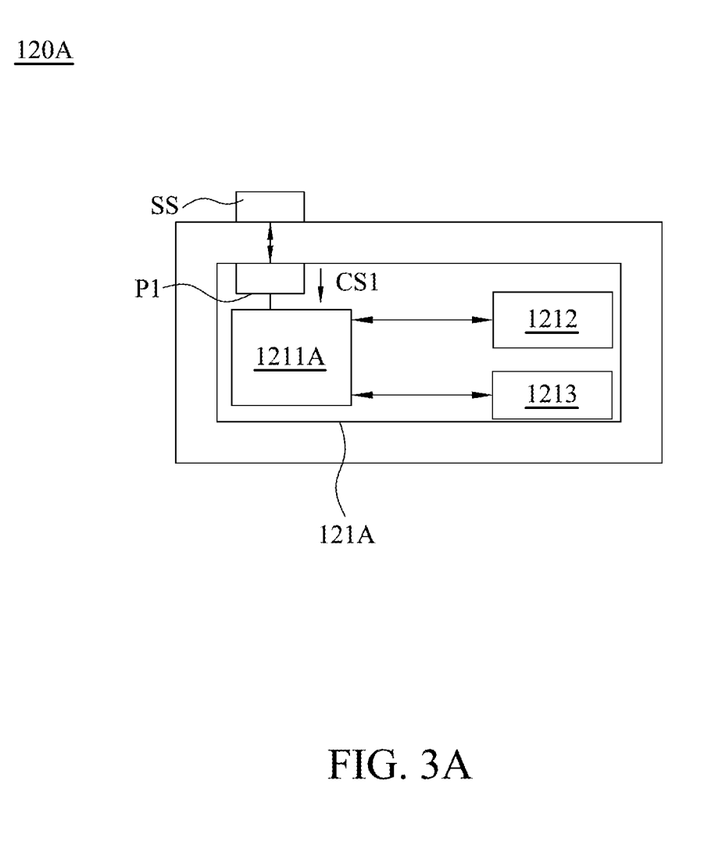
FIG. 3A is a schematic diagram illustrating an implementation of switching a configuration of a dongle device according to some embodiments of the present disclosure.

References are made to FIG. 1 and FIG. 3A. FIG. 3A is a schematic diagram illustrating an implementation of switching a configuration of a dongle device 120A according to some embodiments of the present disclosure. In some embodiments, the dongle device 120 in FIG. 1 can be implemented by the dongle device 120A.

As illustrated in FIG. 3A, the dongle device 120A includes a processor chip 121A. The processor chip 121A includes a pin P1. The configuration of a logic circuit 1211A in the processor chip 121A can be switched among the candidate configurations according to a level of a control signal CS1 from the pin P1.

In some embodiments, a switch element SS can be disposed on the dongle device 120A, and the pin P1 can be coupled to the switch element SS and the logic circuit 1211A. The switch element SS is, for example, a button or a switch, but the present disclosure is not limited thereto. When a user presses this button or switch, the pin P1 can receive a signal corresponding to the operation of pressing this button or this switch and the pin P1 can output a corresponding control signal CS1 (e.g., with a logic value 0) to the logic circuit 1211A according to the received signal. When the control signal CS1 has the logic value 0, the configuration of the logic circuit 1211A can be switched to one of the candidate configurations. Then, when a user presses this button or this switch again, the pin P1 can receive another signal corresponding to the operation of pressing this button or this switch and the pin P1 can output another corresponding control signal CS1 (e.g., with a logic value 1). When the control signal CS1 has the logic value 1, the configuration of the logic circuit 1211A can be switched to another candidate configuration. In other words, in the aforementioned embodiments, the user can control whether to switch the configuration of the logic circuit 1211A.

In some embodiments, the pin P1 is a general-purpose input/output (GPIO) pin or an inter-integrated circuit (I²C) bus pin, but the present disclosure is not limited thereto.

In some other embodiments, the processor chip 121A can include a plurality of pins P1, and these pins P1 can indicate a plurality of bits. For example, when the processor chip 121A includes three pins P1, and these pins P1 can correspond to three bits. Accordingly, based on the levels of control signals received at these pins P1, the configuration of the logic circuit 1211A can be switched among eight (i.e., $2^3$) candidate configurations.

Figure 3B:
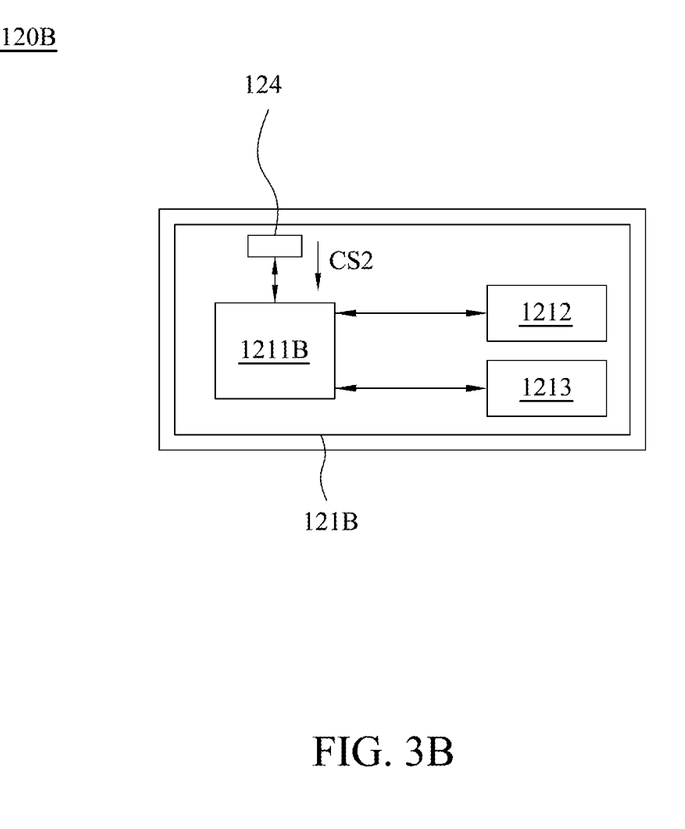
FIG. 3B is a schematic diagram illustrating an implementation of switching a configuration of a dongle device according to some embodiments of the present disclosure.

References are made to FIG. 1 and FIG. 3B. FIG. 3B is a schematic diagram illustrating an implementation of switching a configuration of a dongle device 120B according to some embodiments of the present disclosure. In some embodiments, the dongle device 120 in FIG. 1 can be implemented by the dongle device 120B.

As illustrated in FIG. 3B, the dongle device 120B includes a processor chip 121B. The processor chip 121B further includes a timer 124. The timer 124 is coupled to the logic circuit 1211B in the dongle device 120B. The timer 124 is configured to count time. When a characteristic is not detected during a threshold time interval, the timer 124 triggers the switch of the configuration of the logic circuit 1211B.

In some embodiments, the characteristic can correspond to a specific packet format. For example, when the electronic device 110 has not worked with the dongle device 120B to implement the advanced network-connection function, the data packet corresponding to the advanced network-connection function (with a specific packet format) is not generated. Under a condition that the threshold time interval is 3 seconds, if the data packet corresponding to the advanced network-connection function is not received (i.e., the characteristic is not detected) when the timer 124 counts from 0 second to 3 seconds, the timer 124 or other control circuit can output a control signal CS2 to switch the configuration of the logic circuit 1211B.

Figure 3C:
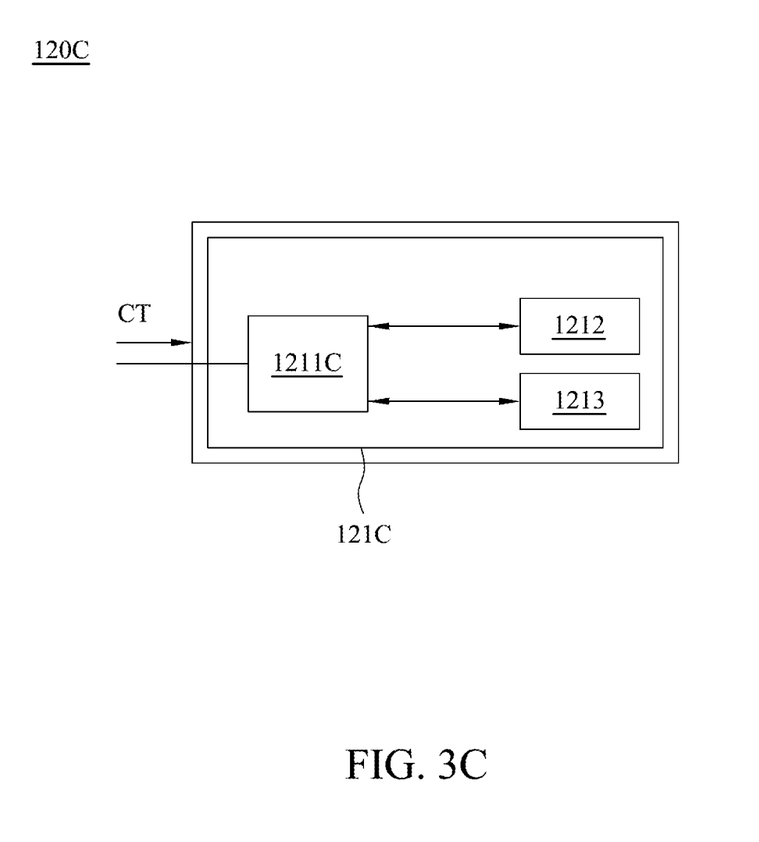
FIG. 3C is a schematic diagram illustrating an implementation of switching a configuration of a dongle device according to some embodiments of the present disclosure.

References are made to FIG. 1 and FIG. 3C. FIG. 3C is a schematic diagram illustrating an implementation of switching a configuration of a dongle device 120C according to some embodiments of the present disclosure. In some embodiments, the dongle device 120 in FIG. 1 can be implemented by the dongle device 120C.

As illustrated in FIG. 3C, the dongle device 120C include a processor chip 121C. When the dongle device 120C receives a command CT from the electronic device 110 in FIG. 1, the configuration of the logic circuit 1211C in the processor chip 121C is switched. As described above, the dongle device 120 can be a USB device. In these embodiments, the operation system OS in the electronic device 110 can include a USB driver program or an application (APP) program. The processor circuit 111 can execute the aforementioned USB driver program or the aforementioned APP program according to different application scenarios to generate a USB protocol command CT to switch the configuration of the logic circuit 1211C.

For example, when the electronic device 110 executes a task that requires a higher network quality (e.g., running an game program that requires internet connection), the USB driver program or the APP program in the operation system OS can switch the configuration of the logic circuit 1211C to the vendor defined configuration so as to implement the advanced network-connection function with higher network quality. When the electronic device 110 executes a task that requires a lower network quality (e.g., a word processing program), the USB driver program or the APP program in the operation system OS can switch the configuration of the logic circuit 1211C to the basic network-connection configuration so as to implement these basic network-connection function for lower power consumption.

Figure 4:
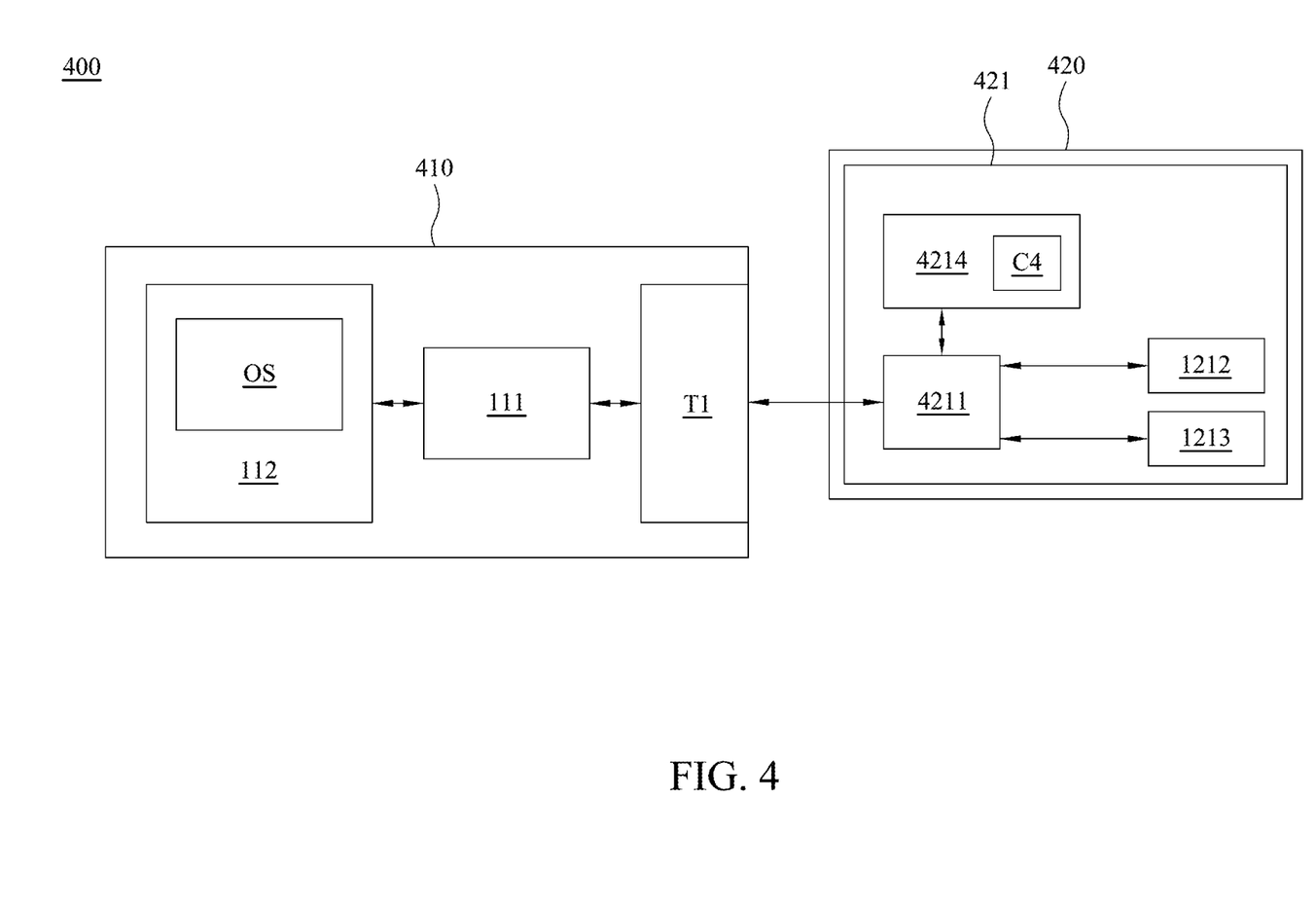
FIG. 4 is a schematic diagram illustrating an electronic system according to some embodiments of the present disclosure.

Reference is made to FIG. 4. FIG. 4 is a schematic diagram illustrating an electronic system 400 according to some embodiments of the present disclosure. An arrangement and operations of electronic system 400 in FIG. 4 are similar to those of the electronic system 100 in FIG. 1.

To be more specific, the electronic device 400 includes an electronic device 410 and a dongle device 420. An arrangement of the electronic device 410 is similar to that of the electronic device 110 in FIG. 1. However, a processor chip 421 in the dongle device 420 further include a memory 4214, and candidate configurations of a logic circuit 4211 in the processor chip 421 further include a memory configuration in addition to the basic network-connection configuration and the vendor defined configuration. In some embodiments, the memory 4214 is a flash memory, but the present disclosure is not limited thereto. The memory 4214 can store a driver program C4. When a configuration of the logic circuit 4211 is switched to the memory configuration, the driver program C4 can be transmitted to the electronic device 410 and be installed in the electronic device 410. Then, the processor circuit 111 can execute the driver program C4 such that the electronic device 410 can work with the processor chip 421 in the dongle device 420 to implement the network-connection function.

Accordingly, in these embodiments, even if the electronic device 410 does not have any built-in basic network-connection driver program or any built-in vendor defined network-connection driver program, the electronic device 410 still can utilize the driver program C4 in the memory 4214 to work with the processor chip 421 in the dongle device 420 to implement the network-connection function.

Similar to the vendor defined driver program C2, in some embodiments, the driver program C4 not only supports the network-connection function, but also supports other functions. In addition, in some other embodiments, the memory 4214 can be disposed in the dongle device 420 but the outside of the processor chip 421, and the memory 4214 can be coupled to the logic circuit 4211.

In some embodiments, when the configuration of the logic circuit 4211 is switched to the memory configuration, the electronic device 410 can update the driver program C4 in the memory 4214. For example, the electronic device 410 can store other versions of driver program or newer versions of driver program into the memory 4214. In other words, when the configuration of the logic circuit 4211 is switched to the memory configuration, data can be read from or written into the memory 4214.

Figure 5:
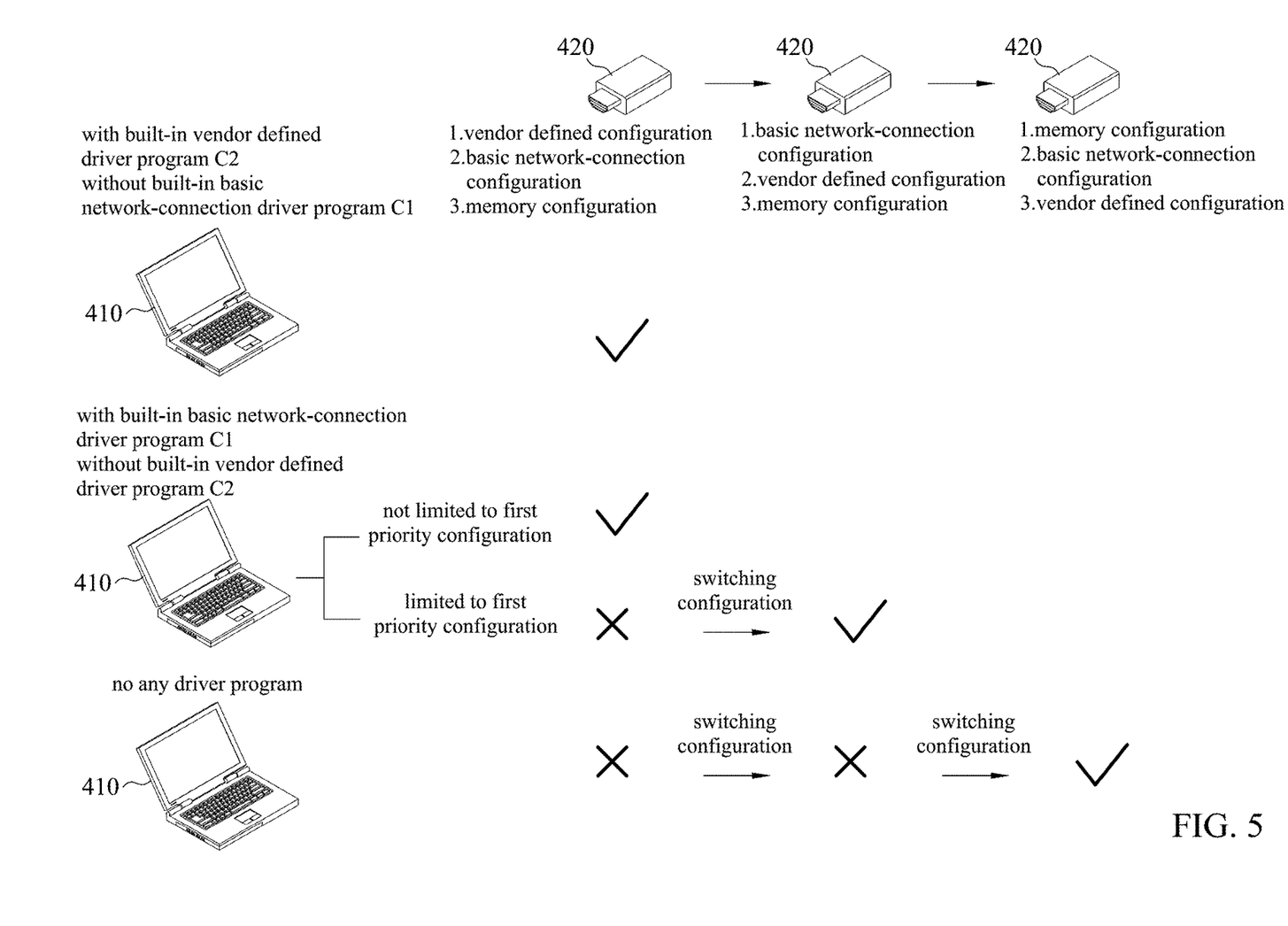
FIG. 5 is a schematic diagram illustrating operations of switching among configurations according to some embodiments of the present disclosure.

Reference is made to FIG. 5. FIG. 5 is a schematic diagram illustrating operations of switching among configurations according to some embodiments of the present disclosure.

For better understanding, FIG. 5 is described with reference to the electronic system 400 in FIG. 4, but the present disclosure is not limited thereto.

As illustrated in FIG. 5, the candidate configurations of the logic circuit 4211 in the dongle device 420 sequentially include a first priority configuration, a second priority configuration, and a third priority configuration according to their priority. These candidate configurations include the basic network-connection configuration, the vendor defined configuration, and the memory configuration.

In a case of the operation system OS in the electronic device 410 with the built-in vendor defined driver program C2 but without the built-in basic network-connection driver program C1, when the configuration of the logic circuit 4211 is the vendor defined configuration, the electronic device 410 can execute the vendor defined driver program C2 to work with the processor chip 421 in the dongle device 420 to implement the advanced network-connection function provided by vendors.

In a case of the operation system OS in the electronic device 410 with the built-in basic network-connection driver program C1 but without the built-in vendor defined driver program C2, when the operation system OS (e.g., Linux) is not limited to the first priority configuration and the candidate configurations include the basic network-connection configuration, the electronic device 410 can execute the basic network-connection driver program C1 to work with the processor chip 421 in the dongle device 420 to implement the basic network-connection function.

In a case of the operation system OS in the electronic device 410 with the built-in basic network-connection driver program C1 but without the built-in vendor defined driver program C2, when the operation system OS (e.g., Windows) is limited to the first priority configuration and the first priority configuration of the logic circuit 4211 is the vendor defined configuration, the electronic device 410 cannot execute the basic network-connection driver program C1. However, when the first priority configuration of the logic circuit 4211 is switched to the basic network-connection configuration, the electronic device 410 can execute the basic network-connection driver program C1 to work with the processor chip 421 in the dongle device 420 to implement the basic network-connection function.

In a case of the operation system OS in the electronic device 410 without any built-in driver program, when the configuration of the logic circuit 4211 is the vendor defined configuration or the basic network-connection configuration, the electronic device 410 cannot work with the processor chip 421 in the dongle device 420 to implement the network-connection function. However, when the configuration of the logic circuit 4211 is switched to the memory configuration, the driver program C4 can be transmitted to the electronic device 410 and be installed in the electronic device 410. Then, the processor circuit 111 can execute the driver program C4 such that the electronic device 410 can associate with the processor chip 421 in the dongle device 420 to implement the network-connection function.

As illustrated in FIG. 5, the dongle device 420 in the present disclosure can be applicable to various electronic devices 410.

Figure 6:
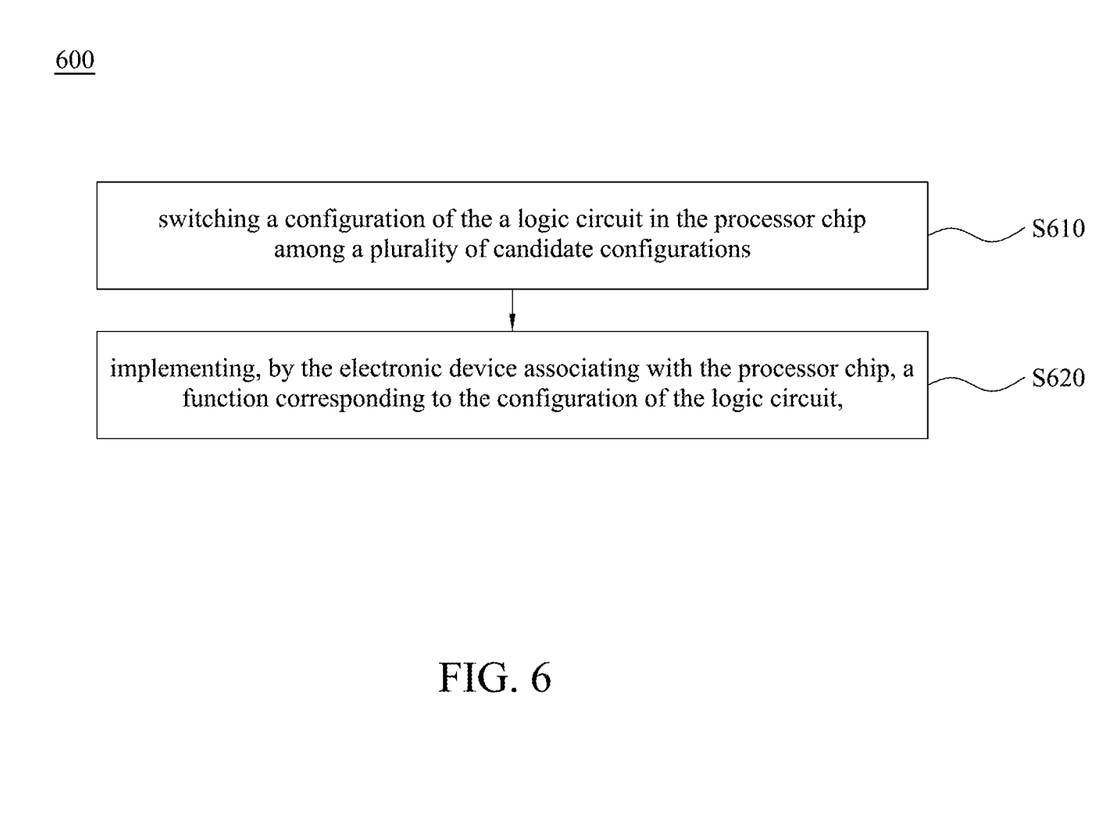
FIG. 6 is a flow diagram illustrating an operation method according to some embodiments of the present disclosure.

Reference is made to FIG. 6. FIG. 6 is a flow diagram illustrating an operation method 600 according to some embodiments of the present disclosure. As illustrated in FIG. 6, the operation method 600 includes operations S610 and S620.

In some embodiments, the operation method 600 can be implemented to the electronic system 100 in FIG. 1 or the electronic system 400 in FIG. 4, but the present disclosure is not limited thereto. For better understanding, following paragraphs are described with reference to the electronic system 400 in FIG. 4.

In operation S610, the configuration of the logic circuit 4211 in the processor chip 421 in the dongle device 420 are switched among the candidate configurations. In some embodiments, the configuration of the logic circuit 4211 can switched between the basic network-connection configuration and the vendor defined configuration. In some further embodiments, the basic network-connection configuration includes at least one of the NCM configuration and the ECM configuration. In some other embodiments, the configuration of the logic circuit 4211 can be switched among the basic network-connection configuration, the vendor defined configuration, and the memory configuration.

In operation S620, the electronic device 410 and the processor chip 421 are associated to implement the function corresponding to the configuration of the logic circuit 4211. In some embodiments, the electronic device 410 can work with the processor chip 421 in the dongle device 420 to implement the network-connection function (e.g., the aforementioned basic network-connection function and/or the advanced network-connection function) according to one of the built-in driver program corresponding to the configuration of the logic circuit 4211, the driver program downloaded from the internet and corresponding to the configuration of the logic circuit 4211, and the driver program stored in the memory 4214 and corresponding to the configuration of the logic circuit 4211.

Based on the descriptions above, in the present disclosure, the configuration of the processor chip in the dongle device can be switched among the candidate configurations. Accordingly, the dongle device of the present disclosure is applicable to various electronic devices.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A processor chip, comprising:
   a logic circuit configured to couple an electronic device, wherein a configuration of the logic circuit corresponds to a plurality of candidate configurations,
   wherein the configuration of the logic circuit is switched among the candidate configurations, and the electronic device associates with the processor chip to implement a function corresponding to the configuration of the logic circuit,
   wherein when the configuration of the logic circuit is a first configuration and the electronic device executes a first driver program, the function is a first network-connection function, the first driver program executed by the electronic device corresponds to the function corresponding to the first configuration of the logic circuit,
   wherein when the configuration of the logic circuit is a second configuration and the electronic device executes a second driver program, the second driver program executed by the electronic device corresponds to the function corresponding to the second configuration of the logic circuit, the function is a second network-connection function different from the first network-connection function.

2. The processor chip of claim 1, wherein an operation system in the electronic device comprises the first driver program or the second driver program.

3. The processor chip of claim 1, wherein a first packet collision rate of the first network-connection function is higher than a second packet collision rate of the second network-connection function.

4. The processor chip of claim 1, wherein the processor chip is disposed in a dongle device, the dongle device comprises a memory, and the memory stores a third driver program,
   wherein the candidate configurations further comprises a third configuration, wherein when the configuration of the logic circuit is switched to the third configuration, the electronic device executes the third driver program to implement a third network-connection function.

5. The processor chip of claim 1, wherein the configuration of the logic circuit is switched from the first configuration to the second configuration, wherein when the configuration of the logic circuit is the first configuration and an operation system in the electronic device comprises the first driver program, the function comprises the first network-connection function and downloading the second driver program, wherein when the configuration of the logic circuit is switched to the second configuration, the function is executing the downloaded second driver program to implement the second network-connection function.

6. The processor chip of claim 5, wherein the first configuration comprises a first basic network-connection configuration and a second basic network-connection configuration,
wherein the configuration of the logic circuit is switched from the first basic network-connection configuration to the second basic network-connection configuration, and is switched from the second basic network-connection configuration to the second configuration,
wherein the first basic network-connection configuration is one of a Network Control Mode (NCM) configuration and an Ethernet Network Control Mode (ECM) configuration, and the second basic network-connection configuration is another one of the NCM configuration and the ECM configuration.

7. The processor chip of claim 1, wherein the processor chip comprises a pin and the pin is coupled to the logic circuit,
wherein the configuration of the logic circuit is switched among the candidate configurations according to a control signal from the pin.

8. The processor chip of claim 7, wherein the processor chip is disposed in a dongle device, a switch element is disposed on the dongle device, the pin is coupled to the switch element, and the control signal is outputted from the pin according to an operation on the switch element.

9. The processor chip of claim 1, further comprising:
a timer coupled to the logic circuit, wherein the timer is configured to output a control signal to switch the configuration of the logic circuit when a characteristic is not detected during a threshold time interval,
wherein the characteristic corresponds to a packet format.

10. The processor chip of claim 1, wherein the configuration of the logic circuit is switched according to a command from the electronic device, wherein the command is generated by a universal serial bus driver program or an application program in an operation system in the electronic device according to an application scenario of the electronic device.

11. A dongle device, comprising:
a processor chip comprising a logic circuit, wherein the dongle device is configured to couple an electronic device, wherein a configuration of the logic circuit corresponds to a plurality of candidate configurations,
wherein the configuration of the logic circuit is switched among the candidate configurations, and the electronic device associates with the processor chip to implement a function corresponding to the configuration of the logic circuit,
wherein when the configuration of the logic circuit is a first configuration and the electronic device executes a first driver program, the function is a first network-connection function, the first driver program executed by the electronic device corresponds to the function corresponding to the first configuration of the logic circuit,
wherein when the configuration of the logic circuit is a second configuration and the electronic device executes a second driver program, the second driver program executed by the electronic device corresponds to the function corresponding to the second configuration of the logic circuit, the function is a second network-connection function different from the first network-connection function.

12. The dongle device of claim 11, wherein an operation system in the electronic device comprises the first driver program or the second driver program.

13. The dongle device of claim 11, further comprising:
a memory storing a third driver program,
wherein the candidate configurations further comprises a third configuration, wherein when the configuration of the logic circuit is switched to the third configuration, the electronic device executes the third driver program to implement a third network-connection function.

14. The dongle device of claim 11, the configuration of the logic circuit is switched from the first configuration to the second configuration,
wherein when the configuration of the logic circuit is the first configuration and an operation system in the electronic device comprises the first driver program, the function comprises the first network-connection function and downloading the second driver program,
wherein when the configuration of the logic circuit is switched to the second configuration, the function is executing the downloaded second driver program to implement the second network-connection function.

15. The dongle device of claim 11, wherein the processor chip comprises a pin and the pin is coupled to the logic circuit,
wherein the configuration of the logic circuit is switched among the candidate configurations according to a control signal from the pin.

16. The dongle device of claim 11, wherein the processor chip further comprises:
a timer coupled to the logic circuit, wherein the timer is configured to output a control signal to switch the configuration of the logic circuit when a characteristic is not detected during a threshold time interval,
wherein the characteristic corresponds to a packet format.

17. The dongle device of claim 11, wherein the configuration of the logic circuit is switched according to a command from the electronic device, wherein the command is generated by a universal serial bus driver program or an application program in an operation system in the electronic device according to an application scenario of the electronic device.

18. An operation method of an electronic system, wherein the electronic system comprises a dongle device and an electronic device, the dongle device is configured to couple the electronic device, and the dongle device comprises a processor chip, wherein the operation method comprises:
switching a configuration of a logic circuit in the processor chip among a plurality of candidate configurations; and
implementing, by the electronic device associating with the processor chip, a function corresponding to the configuration of the logic circuit,
wherein when the configuration of the logic circuit is a first configuration and the electronic device executes a first driver program, the function is a first network-connection function, the first driver program executed by the electronic device corresponds to the function corresponding to the first configuration of the logic circuit, wherein when the configuration of the logic circuit is a second configuration and the electronic device executes a second driver program, the second driver program executed by the electronic device corresponds to the function corresponding to the second configuration of the logic circuit, the function is a second network-connection function different from the first network-connection function.

19. The operation method of claim 18, further comprising:

switching the configuration of the logic circuit to the first configuration;

implementing, by the electronic device associating with the processor chip, the first network-connection function to download the second driver program when an operation system in the electronic device comprises the first driver program;

switching the configuration of the logic circuit from the first configuration to the second configuration; and executing, by the electronic device associating with the processor chip, the downloaded second driver program to implement the second network-connection function.

20. The operation method of claim 18, wherein the dongle device further comprises a memory and the memory stores a third driver program, wherein the operation method further comprises:

switching the configuration of the logic circuit to a third configuration; and executing, by the electronic device, the third driver program to implement a third network-connection function.

* * * * *